United States Patent Office 3,455,931
Patented July 15, 1969

3,455,931
N-AMINOALKOXYCARBOSTYRILS
Bernard Loev, Broomall, Pa., assignor to Smith Kline & French Laboratories, Philadelphia, Pa., a corporation of Pennsylvania
No Drawing. Filed July 25, 1967, Ser. No. 655,774
Int. Cl. C07d 33/12, 33/60, 33/52
U.S. Cl. 260—288                                    5 Claims

ABSTRACT OF THE DISCLOSURE

Carbostyril compounds having an N-aminoalkoxy substituent are prepared by reacting a 1-hydroxycarbostyril with a haloethyl (or propyl) amine and, optionally to prepare the thiocarbostyrils, reacting with phosphorus pentasulfide. These compounds have hypotensive activity.

---

This invention relates to new N-aminoalkoxycarbostyrils having pharmacodynamic activity, in particular having hypotensive activity. For example, hypotensive activity is demonstrated in anesthetized dogs at doses of 0.5 to 2.5 mg./kg. administered intravenously and in anesthetized cats at doses of 1 to 5 mg./kg. administered intravenously.

The compounds of this invention are represented by the following formula:

Formula I

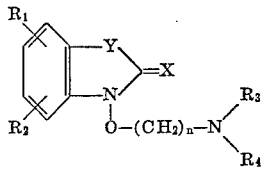

in which:

Y is —CH=CH— or —CH$_2$—CH$_2$—;
X is oxygen or sulfur;
R$_1$ is hydrogen, halogen, trifluoromethyl, lower alkyl, lower alkoxy, nitro, amino, mono-lower alkylamino, di-lower alkylamino, lower alkanoylamino, lower alkoxycarbonyl, carboxy, carbamoyl or sulfamoyl and R$_2$ is hydrogen or R$_1$ and R$_2$, taken together, are dihalogen or di-lower alkoxy or R$_1$ and R$_2$, taken together and on adjacent carbon atoms, are methylenedioxy;
R$_3$ and R$_4$ are hydrogen or lower alkyl; and
n is an integer from 2 to 3 and pharmaceutically acceptable salts thereof.

Preferred compounds of this invention are represented by Formula I when:

Y is —CH=CH— or —CH$_2$—CH$_2$—;
R$_1$ is hydrogen, chloro or trifluoromethyl;
R$_2$ is hydrogen;
R$_3$ and R$_4$ are methyl; and
n is 2 or 3, preferably 2.

The terms "lower alkyl," "lower alkoxy" and "lower alkanoyl" where used herein denote groups having 1–4, preferably 1–2, carbon atoms and "halogen" denotes chloro, bromo or fluoro.

Compounds of this invention are prepared by the following procedure:

Formula II

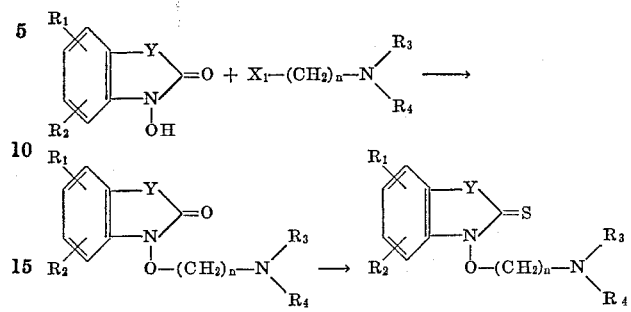

The terms Y, R$_1$, R$_2$, R$_3$, R$_4$ and n are as defined above and X$_1$ is chloro or bromo.

According to the above procedure, a 1-hydroxycarbostyril is reacted with a haloethyl (or propyl) amine to give an N-aminoalkoxycarbostyril. The reaction is preferably carried out with an excess of the haloalkylamine in the presence of at least one equivalent of a base such as sodium lower alkoxide, for example, sodium methoxide or ethoxide, and in a suitable solvent, for example dimethylsulfoxide or methanol, preferably at elevated temperature.

To prepare the thiocarbostyril compounds of this invention, i.e., compounds in which Y is sulfur, the corresponding oxo compounds are treated with phosphorus pentasulfide.

The 1-hydroxycarbostyril starting materials are either known to the art or are prepared by known methods, for example, by converting the corresponding quinoline to the quinoline oxide by treating with a peracid, such as peracetic acid, and oxidizing the quinoline oxide, for example, by using potassium ferricyanide and sodium hydroxide solution.

The 3,4-dihydro-1-hydroxycarbostyril starting materials are prepared from the corresponding 1-hydroxycarbostyrils by catalytic hydrogenation using, for example, Raney nickel or platinum as the catalyst, or reduction with sodium amalgam in a lower alkanol and acetic acid.

The hydroxycarbostyril starting materials of Formula II in which R$_1$ is amino are prepared by (1) reducing the corresponding nitro compounds preferably chemically using, for example, ferrous sulfate in ammonia or (2) by hydrolyzing the corresponding lower alkanoylamino compound by heating with an excess of base, such as aqueous sodium hydroxide solution.

Alternatively, certain of the compounds of Formula I are prepared from other compounds of Formula I as follows.

The compounds of Formula I in which Y is

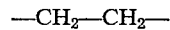

are prepared by catalytic hydrogenation or chemical reduction of the corresponding compounds in which Y is —CH=CH—. Also, compounds of Formula I in which R$_1$ is amino are prepared by reducing the corresponding compounds in which R$_1$ is nitro or hydrolyzing the corresponding compound in which R$_1$ is lower alkanoylamino. Compounds of Formula I in which R$_1$ is carboxy are prepared by hydrolyzing the corresponding lower alkoxycarbonyl compounds.

Compounds of Formula I in which Y is —CH$_2$—CH$_2$— and R$_1$ is nitro are prepared by oxidizing the corresponding compounds in which R$_1$ is amino.

The pharmaceutically acceptable salts of the compounds of Formula I are formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, tartaric, salicylic, citric, gluconic, lactic, malic, mandelic, cinnamic, citraconic, aspartic, itaconic, glycolic, p-aminobenzoic, glutamic, benzene sulfonic, toluene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of this invention may be administered internally in conventional dosage forms by incorporating an appropriate dose of the compound with pharmaceutical carriers according to accepted pharmaceutical practices.

The following examples are not limiting but are illustrative of the compounds of this invention and processes for their preparation.

EXAMPLE 1

To 100 g. of 6-trifluoromethylquinoline in 200 ml. of acetic acid is added 193 g. of 40% peracetic acid, keeping the temperature below 50° C. The mixture is stirred at 70° C. for ten hours, then concentrated in vacuo. Ether is added and gaseous hydrogen chloride is passed into the solution until no more precipitate forms. The precipitate is filtered off and dissolved in water. Extracting with chloroform, then drying and concentrating the extract gives the N-oxide of 6-trifluoromethylquinoline.

To a mixture of 268 g. of potassium ferricyanide in 1070 ml. of water and 2680 ml. of 5% aqueous sodium hydroxide solution is added 63 g. of the N-oxide of 6-trifluoromethylquinoline. The resulting solid material is filtered off, then stirred with dilute hydrochloric acid. Filtering, drying the solid material, then extracting with hot isopropyl ether and concentrating the extracts gives 1-hydroxy-6-trifluoromethylcarbostyril.

A solution of 4.2 g. of sodium methoxide in 150 ml. of dimethylsulfoxide is heated on a steam bath for 15 minutes with stirring. To this hot solution is then added 15 g. of 1-hydroxy-6-trifluoromethylcarbostyril. The resulting solution is heated for 15 minutes, then cooled to room temperature. 3-chloro-N,N-dimethylethylamine (9.4 g.) is added and the mixture is then heated on the steam bath with stirring for about 20 minutes, then cooled to room temperature overnight and filtered. The filtrate is diluted with water and extracted with ether. The ether extracts are combined and extracted with dilute hydrochloric acid. The aqueous extract is then made basic with aqueous sodium hydroxide solution. The resulting oily layer is isolated and extracted with ether. The ether extracts are combined, dried, filtered and concentrated to dryness in vacuo to give 1-(2-dimethylaminoethoxy)-6-trifluoromethylcarbostyril.

A sample of the above prepared product is suspended in water and perchloric acid is added. The mixture is heated, then chilled and filtered. The solid material is recrystallized from water to give 1-(2-dimethylaminoethoxy)-6-trifluoromethylcarbostyril perchlorate.

EXAMPLE 2

A solution of 2 g. of sodium methoxide in dimethylsulfoxide is heated on the steam bath with stirring for 15 minutes. Seven grams of 1-hydroxy-6-trifluoromethylcarbostyril (prepared as in Example 1) is added and the resulting mixture is heated for 15 minutes, then cooled to room temperature. A yellow solid separates. 3-chloro-N,N-dimethylpropylamine (4.6 g.) is added and the mixture is heated with stirring for 30 minutes. The reaction mixture is cooled to room temperature, stirred overnight and then filtered. The filtrate is diluted with water and then extracted with ether. The ether extracts are combined and extracted with dilute hydrochloric acid. The aqueous layer is made basic with aqueous sodium hydroxide solution. The oil which separates is extracted with ether. The extracts are combined, dried, filtered and concentrated to dryness in vacuo to give 1-(3-dimethylaminopropoxy)-6-trifluoromethylcarbostyril.

A sample of the above prepared product is suspended in water. Perchloric acid is added. The mixture is heated, then chilled and filtered. The solid material is recrystallized from water to give 1-(3-dimethylaminopropoxy)-6-trifluoromethylcarbostyril perchlorate.

EXAMPLE 3

By the procedure of Example 1, 10.6 g. of N-hydroxycarbostyril is heated on a steam bath with sodium methoxide in dimethylsulfoxide, then 3-chloropropyl-N,N-dimethylamine is added and the mixture is heated for 20 minutes. Working up as in Example 1 gives N-(2-dimethylaminoethoxy)carbostyril.

To a solution of 23.2 g. of N-(2-dimethylaminoethoxy)-carbostyril in 150 ml. pyridine is added 25 g. of phosphorus pentasulfide and the resulting mixture is heated at reflux for two hours, then poured onto ice and extracted with chloroform and methylene chloride. The organic layer is extracted with water, dried over magnesium sulfate, filtered and concentrated to give N-(2-dimethylaminoethoxy)thiocarbostyril.

A sample of the above prepared thiocarbostyril is dissolved in ether and treated with hydrogen chloride. The precipitated solid is filtered off to give N-(2-dimethylaminoethoxy)thiocarbostyril hydrochloride.

EXAMPLE 4

By the procedure of Example 1 using, in place of the N-oxide of 6-trifluoromethylquinoline, the following:

N-oxide of 6-chloroquinoline,
N-oxide of 7-chloroquinoline,
N-oxide of 6-methylquinoline, the following products are obtained, respectively:

6-chloro-1-(2-dimethylaminoethoxy)carbosytril,
7-chloro-1-(2-dimethylaminoethoxy)carbostyril,
1-(2-dimethylaminoethoxy)-6-methylcarbostyril.

The above prepared 6-chloro-1-(2-dimethylaminoethoxy)carbostyril is hydrogenated in acetic acid using platinum as catalyst. After filtering and concentrating in vacuo, 6 - chloro-1(2-dimethylaminoethoxy)-3,4 - dihydrocarbostyril is obtained.

A dry solution of toluene sulfonic acid in ether is added to a sample of 6-chloro-1-(2-dimethylaminoethoxy)-3,4-dihydrocarbostyril in ether. The resulting precipitate is filtered off to give the toluene sulfonate salt of 6-chloro-1-(2-dimethylaminoethoxy)-3,4-dihydrocarbostyril.

EXAMPLE 5

Using the following quinoline compounds in the procedure of Example 1:

6-bromoquinoline,
6-nitroquinoline,
6-acetamidoquinoline,
6-quinolinecarboxamide, 6-methylaminoquinoline,
6-dimethylaminoquinoline,
6,7-methyenedioxyquinoline, the following products are obtained, respectively:

6-bromo-1-(2-dimethylaminoethoxy)carbostyril,
1-(2-dimethylaminoethoxy)-6-nitrocarbostyril,
6-acetamido-1-(2-dimethylaminoethoxy)carbostyril,
6-carbamoyl-1-(2-dimethylaminoethoxy)carbostyril,
1-(2-dimethylaminoethoxy)-6-methylaminocarbostyril,
6-dimethylamino-1-(2-dimethylaminoethoxy)carbostyril,
1-(2-dimethylaminoethoxy)-6,7-methylenedioxycarbostyril.

EXAMPLE 6

Four grams of 1-hydroxy-6-trifluoromethylcarbostyril in ethanol is hydrogenated in the presence of Raney nickel for five hours. The mixture is filtered and the filtrate is concentrated in vacuo to give 3,4-dihydro-1-hydroxy-6-trifluoromethylcarbostyril.

A solution of 0.7 g. of sodium methoxide in 50 ml. of dimethylsulfoxide is heated with stirring on a steam bath for 15 minutes. 3,4-dihydro-1-hydroxy-6-trifluoromethylcarbostyril (2.3 g.) is added and the resulting mixture is heated for 15 minutes on a steam bath, then cooled to room temperature and treated with 1.3 g. of 3-chloro-N,N-dimethylethylamine. After heating this mixture on a steam bath for 20 minutes, then working up as in Example 1, 1-(2-dimethylaminoethoxy)-3,4-dihydro-6-trifluoromethylcarbostyril is obtained.

Phosphorus pentasulfide (2.5 g.) is added to 2.7 g. of 1-(2 - dimethylaminoethoxy) - 3,4 - dihydro-6-trifluoromethylcarbostyril and 10 ml. of pyridine and the resulting mixture is heated at reflux for two hours, then is poured onto ice and extracted with chloroform and methylene chloride. The organic layer is extracted with water, dried over magnesium sulfate, filtered and concentrated to give 1-(2 - dimethylaminoethoxy) - 3,4 - dihydro-6-trifluoromethylthiocarbostyril.

A sample of the above prepared thiocarbostyril is dissolved in ethanol and to the ethanol solution is added dilute sulfuric acid to neutrality. The solution is concentrated to dryness in vacuo to give the sulfate salt of 1-(2-dimethylaminoethoxy) - 3,4 - dihydro-6-trifluoromethylthiocarbostyril.

EXAMPLE 7

The following quinolines are converted to the corresponding 1-hydroxyquinolines by the procedure of Example 1:

6-sulfamoylquinoline,
6-methoxycarbonylquinoline,
6,7-dimethoxyquinoline,
5,7-dichloroquinoline.

By the procedure of Example 2, each of these 1-hydroxyquinolines is reacted with 3-chloro-N,N-dimethylpropylamine to give the following products, respectively:

1-(3-dimethylaminopropoxy)-6-sulfamoylcarbostyril,
1 - (3-dimethylaminopropoxy)-6-methoxycarbonylcarbostyril,
1-(3-dimethylaminopropoxy)-6,7-dimethoxycarbostyril,
5,7-dichloro-1-(3-dimethylaminopropoxy)carbostyril.

An ethanol solution of 1-(3-dimethylaminopropoxy)-6-methoxycarbonylcarbostyril is heated at reflux with an excess of 10% aqueous sodium hydroxide solution to give, after neutralizing with dilute hydrochloric acid followed by extracting with ether and removing the ether from the extracts in vacuo, 6-carboxy - 1 - (3 - dimethylaminopropoxy)carbostyril.

EXAMPLE 8

By the procedure of Example 1, 6-nitroquinoline is treated with peracetic acid and the resulting N-oxide of 6-nitroquinoline is reacted with potassium ferricyanide and aqueous sodium hydroxide to give 1-hydroxy-6-nitroquinoline. A solution of 41.2 g. of this compound in 200 ml. of 4 N ammonium hydroxide is added to a suspension of 280 g. of ferrous sulfate in 560 ml. of water and 120 ml. of concentrated ammonium hydroxide. The resulting mixture is heated for 1.5 hours on a steam bath then is filtered, made acidic with acetic acid and extracted with ether. The ether extract is dried and concentrated in vacuo to give 6-amino-1-hydroxycarbostyril.

Using 6-amino-1-hydroxycarbostyril in place of 1-hydroxy-6-trifluoromethylcarbostyril in the procedure of Example 1 gives 6-amino-1(2-dimethylaminoethoxy)carbostyril.

EXAMPLE 9

By the procedure of Example 1, 6-methoxyquinoline in acetic acid is treated with peracetic acid to give the N-oxide which is oxidized with potassium ferricyanide in water and 5% aqueous sodium hydroxide solution to give 1-hydroxy-6-methoxycarbostyril.

To a hot solution of 6.5 g. of sodium methoxide in 250 ml. of dimethylsulfoxide is added 19.1 g. of 1-hydroxy-6-methoxycarbostyril. After heating this solution on a steam bath for 15 minutes, then cooling to room temperature, 11.7 g. of 3-chloro - N - methylethylamine is added. The resulting mixture is heated with stirring on a steam bath for 20 minutes, then cooled and worked up as in Example 1 to give 6-methoxy-1-(2-methylaminoethoxy)carbostyril.

EXAMPLE 10

1-hydroxy-6-trifluoromethylcarbostyril, prepared as described in Example 1, is reacted with the following chloroalkylamines by the procedure of Example 1:

2-chloroethylamine,
3-chloropropylamine,
3-chloro-N,N-diethylpropylamine,
3-chloro-N,N-diisopropylamine, to give the following products, respectively:

1-(2-aminoethoxy)-6-trifluoromethylcarbostyril,
1-(3-aminopropoxy)-6-trifluoromethylcarbostyril,
1-(3-diethylaminopropoxy)-6-trifluoromethylcarbostyril,
1 - (3 - diisopropylaminopropoxy)-6-trifluormethylcarbostyril.

What is claimed is:
1. A compound of the formula:

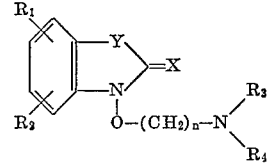

in which:
Y is —CH=CH— or —CH₂—CH₂—;
X is oxygen or sulfur;
R₁ is hydrogen, halogen, trifluoromethyl, lower alkyl, lower alkoxy, lower alkoxycarbonyl, carboxy, carbamoyl or sulfamoyl and R₂ is hydrogen or R₁ and R₂, taken together, are dihalogen or di-lower alkoxy or R₁ and R₂, taken together and on adjacent carbon atoms, are methylenedioxy;
R₃ and R₄ are hydrogen or lower alkyl; and
n is an integer from 2 to 3 or pharmaceutically acceptable salts thereof.
2. A compound according to claim 1 in which Y is —CH=CH—, X is oxygen, R₁ is trifluoromethyl in the 6-position, R₂ is hydrogen, R₃ and R₄ are methyl and n is 2, said compound being 1-(2-dimethylaminoethoxy)-6-trifluoromethylcarbostyril.
3. A compound according to claim 1 in which Y is —CH=CH—, X is oxygen, R₁ is trifluoromethyl in the 6-position, $R_2$ is hydrogen, $R_3$ and $R_4$ are methyl and $n$ is 3, said compound being 1-(3-dimethylaminopropoxy)-6-trifluoromethylcarbostyril.

4. A compound according to claim 1 in which Y is —CH=CH—, X is oxygen, $R_1$ is chloro in the 6-position, $R_2$ is hydrogen, $R_3$ and $R_4$ are methyl and $n$ is 2, said compound being 6-chloro-1-(2-dimethylaminoethoxy)-carbostyril.

5. A compound according to claim 1 in which Y is —CH=CH—, X is oxygen, $R_1$ and $R_2$ are hydrogen, $R_3$ and $R_4$ are methyl and $n$ is 2, said compound being 1-(2-dimethylaminoethoxy)carbostyril.

References Cited

UNITED STATES PATENTS

| | | | |
|---|---|---|---|
| 2,381,082 | 8/1945 | Shinkle | 167—33 |
| 2,754,293 | 7/1956 | Brody et al. | 260—288 X |
| 3,005,823 | 10/1961 | Kaeding | 260—287 |
| 3,141,888 | 7/1964 | Loev | 260—289 |
| 3,300,502 | 1/1967 | Seeger | 260—289 |

OTHER REFERENCES

Cavallito et al. Jour. Am. Chem. Soc., vol. 66, pp. 1166–71 (1944).

ALEX MAZEL, Primary Examiner

D. G. DAUS, Assistant Examiner

U.S. Cl. X.R.

260—256, 286, 287, 289, 583, 687, 690; 424—258